United States Patent [19]

Takano

[11] Patent Number: 5,680,221
[45] Date of Patent: Oct. 21, 1997

[54] DIGITAL COPYING APPARATUS CAPABLE OF EFFICIENTLY RESTARTING A COPY OPERATION AFTER A PAPER JAM

[75] Inventor: Yoshiaki Takano, Toyohashi, Japan

[73] Assignee: Minolta Co., Ltd., Osaka, Japan

[21] Appl. No.: 303,448

[22] Filed: Sep. 9, 1994

[30] Foreign Application Priority Data

Sep. 12, 1993 [JP] Japan .................. 5-249947

[51] Int. Cl.⁶ ............... H04N 1/00; H04N 1/04; G03G 21/00
[52] U.S. Cl. ........... 358/296; 358/300; 358/444; 358/498; 399/18; 399/21; 399/83; 399/367
[58] Field of Search .................. 358/296, 300, 358/401, 444, 468, 498; 395/113, 115, 116; 399/18, 19, 21, 81, 83, 367, 405; 355/205-208, 308, 313, 314, 321

[56] References Cited

U.S. PATENT DOCUMENTS

| | | | |
|---|---|---|---|
| 4,511,241 | 4/1985 | Tsudaka et al. | 399/18 |
| 4,621,921 | 11/1986 | Takahata et al. | 399/18 |
| 5,018,081 | 5/1991 | Yamaguchi et al. | 364/519 |
| 5,034,780 | 7/1991 | Kotabe et al. | 355/206 X |
| 5,148,286 | 9/1992 | Knedt et al. | 358/296 |
| 5,367,362 | 11/1994 | Forest | 355/208 |
| 5,517,295 | 5/1996 | Kaneko et al. | 355/313 |
| 5,543,893 | 8/1996 | Sheldon et al. | 355/206 |

*Primary Examiner*—Eric Frahm
*Attorney, Agent, or Firm*—Sidley & Austin

[57] ABSTRACT

A digital copying apparatus having an image data memory and an automatic document feeder (ADF). The digital copying apparatus reads an image of an original document placed on a document platen and generates image data to be stored in the memory. When a copy sheet jam occurs during operation of an image forming section, it is determined whether or not the uncopied image data which have been generated but have not yet been copied are stored in the memory based on the detection of discharge of copy sheets from the apparatus. When all uncopied image data are stored in the memory, the copy operation is restarted using the image data stored in the memory. When all uncopied image data are not stored in the memory, the original document is discharged from a document transport path of the ADF to a discharge tray and the number of original documents to be returned to a feed tray is displayed on a display.

13 Claims, 7 Drawing Sheets

ND_COPYING APPARATUS CAPABLE
DIGITAL COPYING APPARATUS CAPABLE OF EFFICIENTLY RESTARTING A COPY OPERATION AFTER A PAPER JAM

BACKGROUND OF THE INVENTION

1. Field of the Invention

The present invention relates to a digital copying apparatus provided with an image data storage means and automatic document feeder (ADF).

2. Description of the Related Art

When a copy paper jam is generated in a printer section which forms an image on a copy sheet in a copying apparatus provided with an ADF, all of the original documents disposed in the original document transport path between the document feed tray and the document discharge tray must be discharged to the document discharge tray when the paper jam is reset. Then, the number of sheets which must be returned to the document tray (i.e., the number of discharged original document sheets which have not been copied) is displayed in a display section.

Digital copying apparatus have been proposed wherein, after an original document image is read and the generated image data are stored in temporary memory, the image data are read from said memory and an image corresponding to said image data is formed on a copy sheet. Since the capacity of the aforesaid memory may be limited, for example, to four A4-size pages, the image data are sequentially eliminated as they become no longer necessary. The capacity of the aforesaid memory need not necessarily correspond to the number of copy sheets present within the paper transport path of the printer section during the printing operation. This is because the number of A4-size copy sheets may differ depending on whether or not the copy sheet feed direction is horizontal or vertical when the A4-size copy sheets are fed inasmuch as the printer operating speed is constant. The aforesaid number of sheets may also differ depending on the presence or absence of a sorting device or the like.

When a paper jam occurs in the printer section, it is undesirable to remove the original document from the ADF feed path and re-feed said original document inasmuch as the original document is readily damaged.

When a paper jam occurs in digital copying apparatus provided with an image data memory and an ADF, the as yet uncopied image data possibly remain stored in memory. Thus, it is possible to activate the aforesaid image data without returning and re-feeding the discharged originals. Since the quantity of as yet unerased image data need not necessarily corresponds to the number of sheets of the original document still to be copied (i.e., the originals which have been fed from the document tray, but which have not yet been copied), the image data of all originals not yet copied cannot be expected to be stored within memory.

SUMMARY OF THE INVENTION

A main object of the present invention is to provide a digital copying apparatus provided with an ADF and an image data memory, and which is capable of efficiently restarting a copy operation even when copy paper jam has occurred.

Another object of the present invention is to increase the degree of freedom in system design and memory capacity in the aforesaid copying apparatus.

A further object of the present invention is to provide the aforesaid copying apparatus wherein the originals need not be returned nor re-fed when a copy sheet jam has occurred, and damage to originals is minimized by elimination of the aforesaid operations when restarting a copy operation.

The main objects of the present invention are achieved by providing a digital copying apparatus comprising an image reader which reads an image of an original document placed on a document platen and generates image data therefrom; a memory which stores the image data generated by said image reader; image forming means for forming an image, corresponding to image data stored in said memory, onto a copy sheet; jam detection means for detecting copy sheet jams during operation of said image forming means; an automatic document feeding device having a document transport path that transports an original document from a feed tray to the document platen and discharges an original document, which has been read by said image reader, to a discharge tray; a discharge sensor which detects discharge of copy sheets; decision means for determining whether or not the original document image data, which have been generated by said image reader but have not been copied, are still stored in said memory, based on the detection result of said discharge sensor, when a copy sheet jam detected by said jam detection means is reset; and control means for discharging an original document from the document transport path to the discharge tray when not all uncopied image data are stored in said memory, and restarting copy operation using the image data stored in said memory when said decision means determines that all uncopied image data are stored in said memory.

These and other objects, advantages and features of the present invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter.

Figure 1:
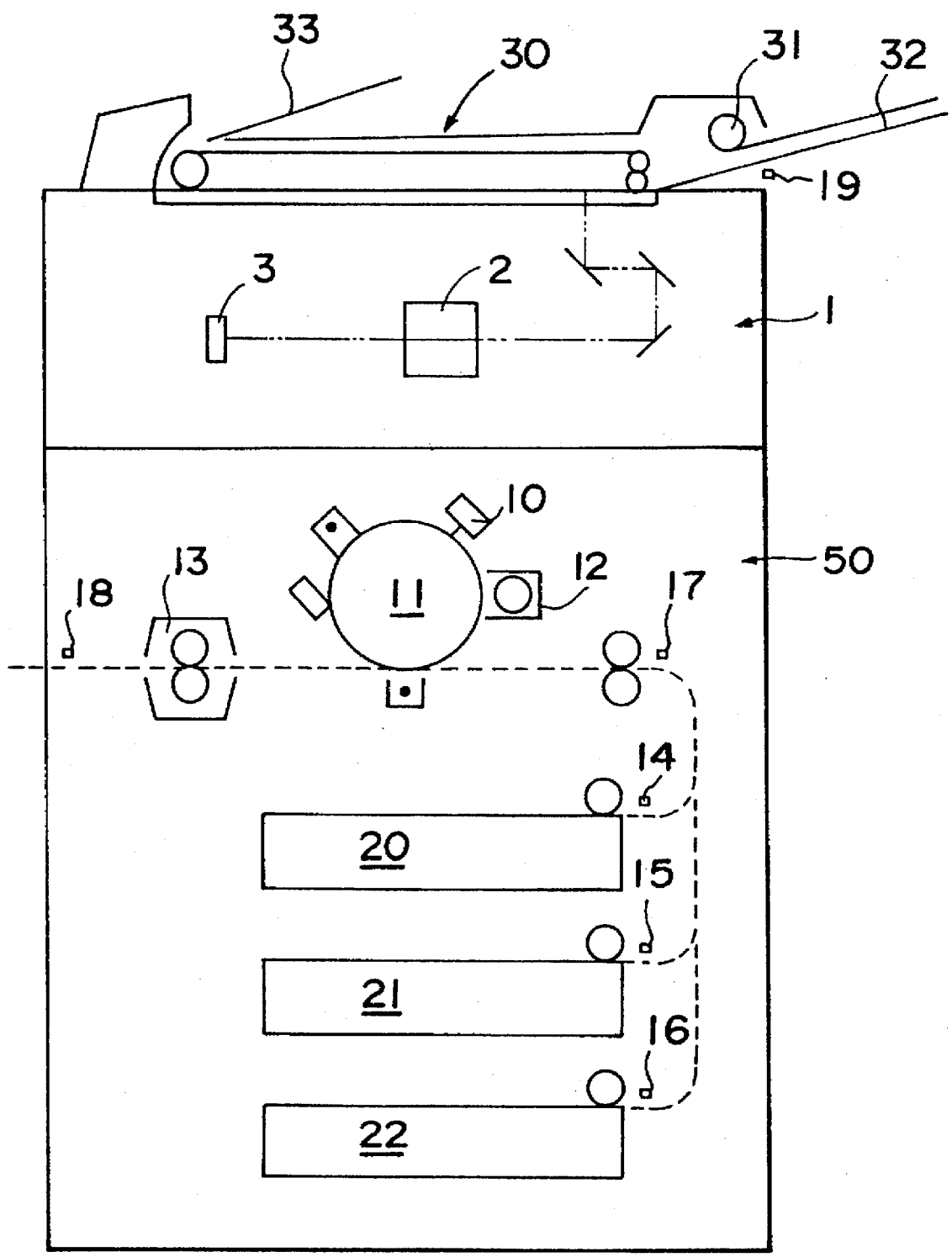
FIG. 1 is a plan view showing the construction of an embodiment of the copying apparatus.

FIG. 1 is a plan view showing the construction of an embodiment of a digital copying apparatus. The digital copying apparatus shown in the drawing is provided with image reader (IR) section 1, printer section 50, and automatic document feeder (ADF) 30.

Figure 3:
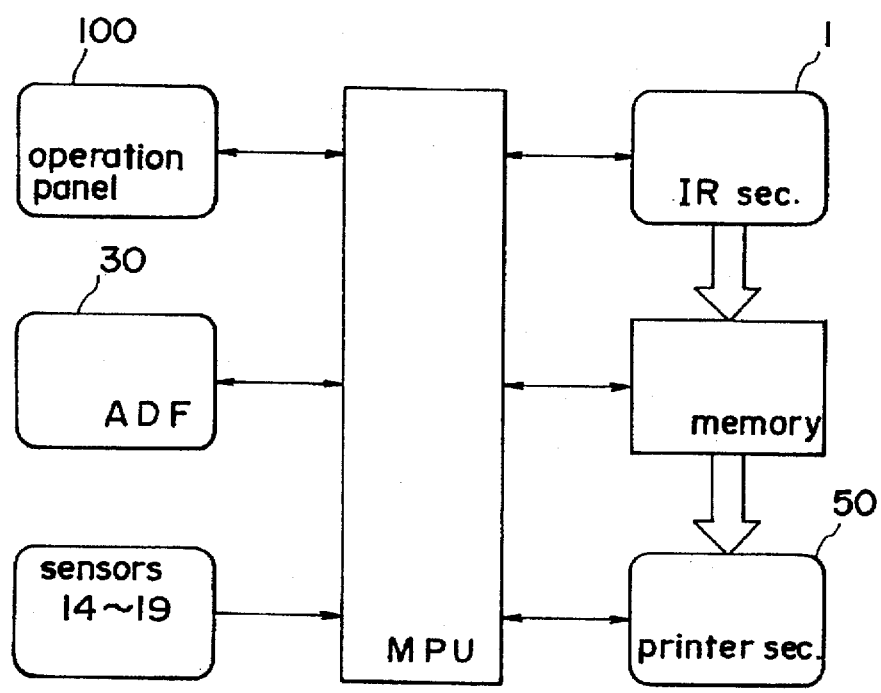
FIG. 3 is a block diagram showing the construction of the control circuit of the aforesaid copying apparatus.

In image reader section 1, an original document placed on the document platen is read via scanning by moving mirrors. That is, the light reflected from the surface of an original document is guided to charge-coupled device (CCD) 3 via mirror groups and lens 2, whereupon said reflected light is photoelectrically converted by said CCD 3, as indicated by the broken line in the drawing. Signals outputted from CCD 3 are subjected to a predetermined process to generate image data, which are subsequently stored in memory (refer to FIG. 3). This memory is a first-in first-out (FIFO) memory for reading out the stored image data in sequence. The amount of storable image data is set beforehand at, for example, four sheets of A4 size paper. The image data read out from the aforesaid memory is erased when an electrostatic latent image of said image data has been formed on the surface of photosensitive drum 11. This erasure of the used image data allows effective use of said memory and reduces the total time required for image reproduction.

In printer section 50, the image data stored in memory is read out, and an image corresponding to said image data is formed on a copy paper sheet. That is, the ON/OFF switching of each element of LED array 10 is controlled in accordance with the readout image data, so as to form an electrostatic latent image corresponding to said image data on the surface of photosensitive drum 11. This electrostatic latent image is then developed by toner so as to be rendered visible via developing device 12, and said developed toner image is subsequently transferred onto a copy sheet.

The copy paper is accommodated in trays 20, 21, and 22; the copy paper of the tray selected in accordance with the copy mode is taken up by the feed roller of the selected tray and transported in the transport path indicated by the broken line in the drawing to the transfer section (the area medial to the photosensitive drum and the transfer charger), whereupon the toner image formed on the surface of photosensitive drum 11 is transferred onto said copy sheet. The copy sheet carrying the transferred toner image is transported to fixing device 13, and subjected to a fixing process via the application of heat and pressure, and is subsequently discharged from the apparatus. This discharge of the copy sheet is detected by sensor 18, and a detection signal is transmitted to the MPU (refer to FIG. 3). Other detection signals transmitted to the MPU in addition to that of the aforesaid sensor 18 include detection signals from sensors 14–16 for detecting paper fed from each paper tray 20–22, sensor 17 for detecting the passage of a copy sheet, or original document sensor 19 for detecting an original document placed in document tray 32 of the ADF.

Automatic document feeder (ADF) 30 is a device which takes up an original document placed on document tray 32 via document feed roller 31, and transports said original document to a standard position on the document platen where it is stopped. When the image of said original document has been read by the previously described image reader section 1, the original is discharged to document discharge tray 33.

Figure 2:
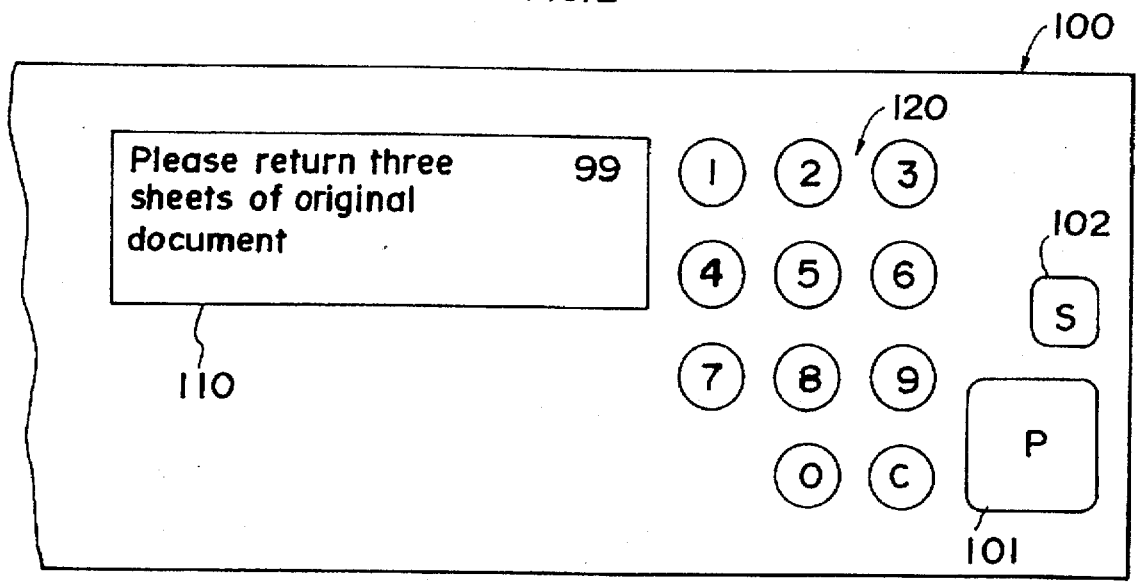
FIG. 2 is an illustration showing a part of the operation panel of the aforesaid copying apparatus.

As shown in FIG. 2, operation panel 100 having an arrangement of various key switches and multipurpose display 110 is provided on the front side of the document platen of the digital copying apparatus. In FIG. 2, when a paper jam occurs, instructions for returning three sheets of the original document discharged to document tray 33 to document tray 32 are displayed on multipurpose display 110. This display is specified by the MPU. In the drawing, item 120 is a ten-key pad for numerical input; item 101 is a print key for commanding the start of a copy operation; and item 102 is a stop key for commanding a halt to an operation. When these key switches are switched ON, signals are transmitted to the MPU.

The operation relating to correction of a copy sheet jam is sequentially described hereinafter with reference to the flow charts of FIGS. 4–8, and 9 (i.e., flow charts showing the processes executed by the MPU).

Figure 4:
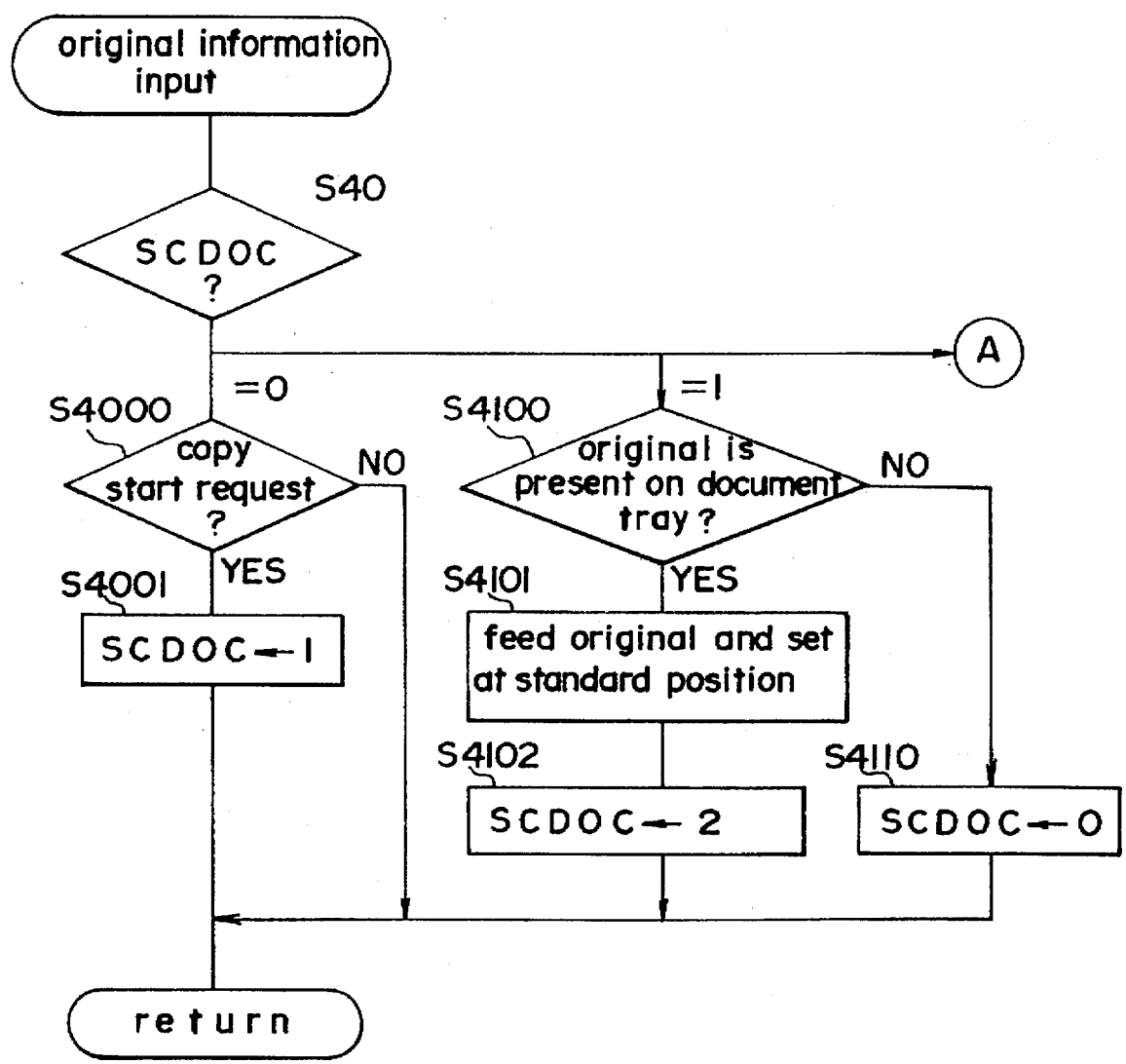
FIG. 4 is a flow chart showing a part of the document information input process executed by the microprocessor unit (MPU) of FIG. 3.
Figure 5:
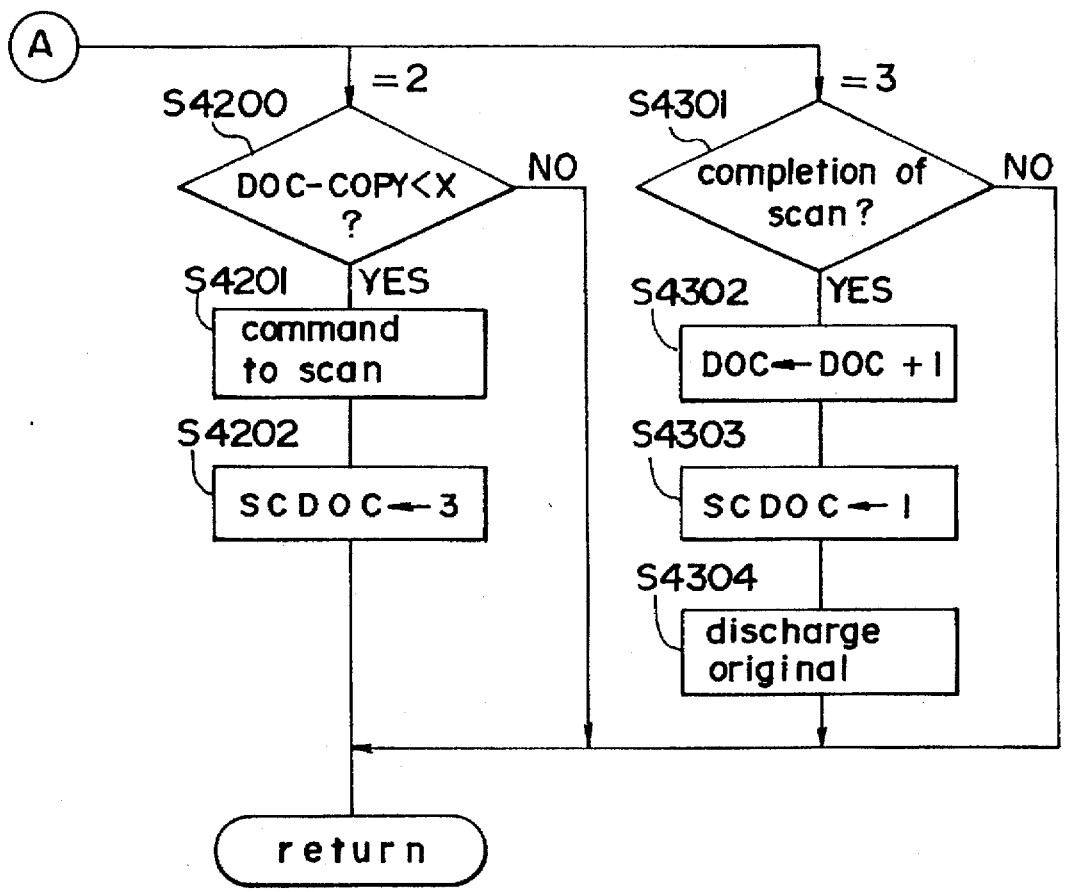
FIG. 5 is a flow chart showing the remaining part of the document information input process executed by the MPU of FIG. 3.

Original document information input process (FIGS. 4 and 5)

In this process, scanning of an original image is commanded on condition that there is a margin of excess storage capacity to store new image data in the memory. After the original document is scanned and storage of image data is completed, variable value DOC is incremented, which indicates the number of sheets of the original document which have been stored in memory.

At initialization, state counter SCDOC is zero [0].

When a copy start request is issued by switching ON print key 101 (step S4000: YES), SCDOC is set at [1] (step S4001).

When SCDOC value is set at [1] and an original document is present on document tray 32 (step S4100: YES), a command is issued to ADF 30 specifying that the original document be set at the standard position (step S4101). In accordance with the issued command, a single sheet of the original document is fed from document tray 32 by feed roller 31 in ADF 30, and transported to the standard position on the document platen.

Thereafter, SCDOC is set at [2] (step S4102).

In case that no original document is present on document tray 32 when SCDOC is set at [1] (step S4100: NO), SCDOC is set at [0] (step S4110).

When SCDOC is set at [2], a determination is made as to whether or not the value, resulting when the number of copied originals COPY of erased image data is subtracted from the number of originals DOC of stored image data, i.e., the number of screens (amount of image data expressed as a number of original document sheets) stored in memory at the current time, is smaller than a maximum value X of the number of screens storable in memory (step S4200).

When the value resulting from the aforesaid arithmetic operation is less than the maximum value X, i.e., when there is a margin of excess storage capacity to store image data of the next original document sheet (step S4200: YES), a command is issued to the image reader section to scan (step S4201), and the original document on the document platen is scanned by said image reader section in accordance with said command.

Thereafter, SCDOC is set at [3] (step S4202).

On the other hand, when the value resulting when the COPY value is subtracted from the DOC value is greater than the maximum value X (step S4200: NO), the apparatus is on standby until the oldest stored image data are erased from memory because there is no margin of excess storage capacity for storing new image data in memory.

When SCDOC is set at [3] and the completion of scanning by image reader section 1 is awaited, then the image data is stored in memory at the completion of said scan (step S4301: YES), the variable value DOC expressing the number of sheets of original document for which data are already stored is incremented (step S4302).

Then, SCDOC is set at [1] so as to execute the identical process for the next original document, (step S4303), and a command is issued to ADF 30 to discharge to the document discharge tray 33 the original document that has been scanned.(Step S4304).

Figure 6:
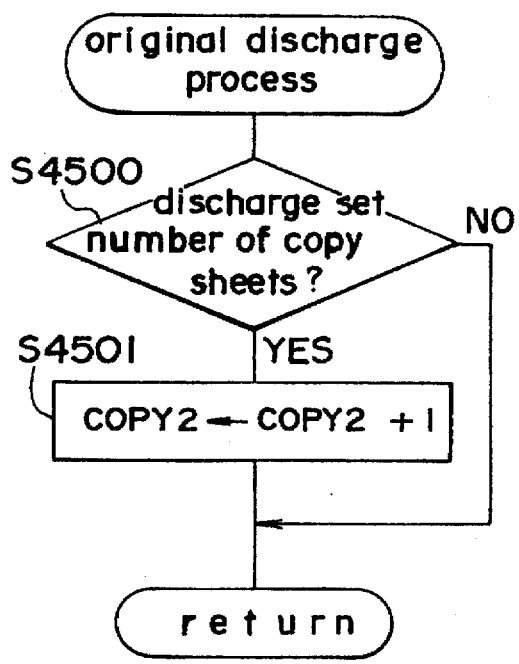
FIG. 6 is a flow chart showing the document discharge process executed by the MPU of FIG. 3.

Original document discharge process (FIG. 6)

When copying is completed for the set number of sheets of the original document (the number set for multiple copying) and the final copy sheet has been discharged from the apparatus (step S4500: YES), variable COPY2 expressing the number of original sheets that have been copied is incremented (step S4501).

Figure 7:
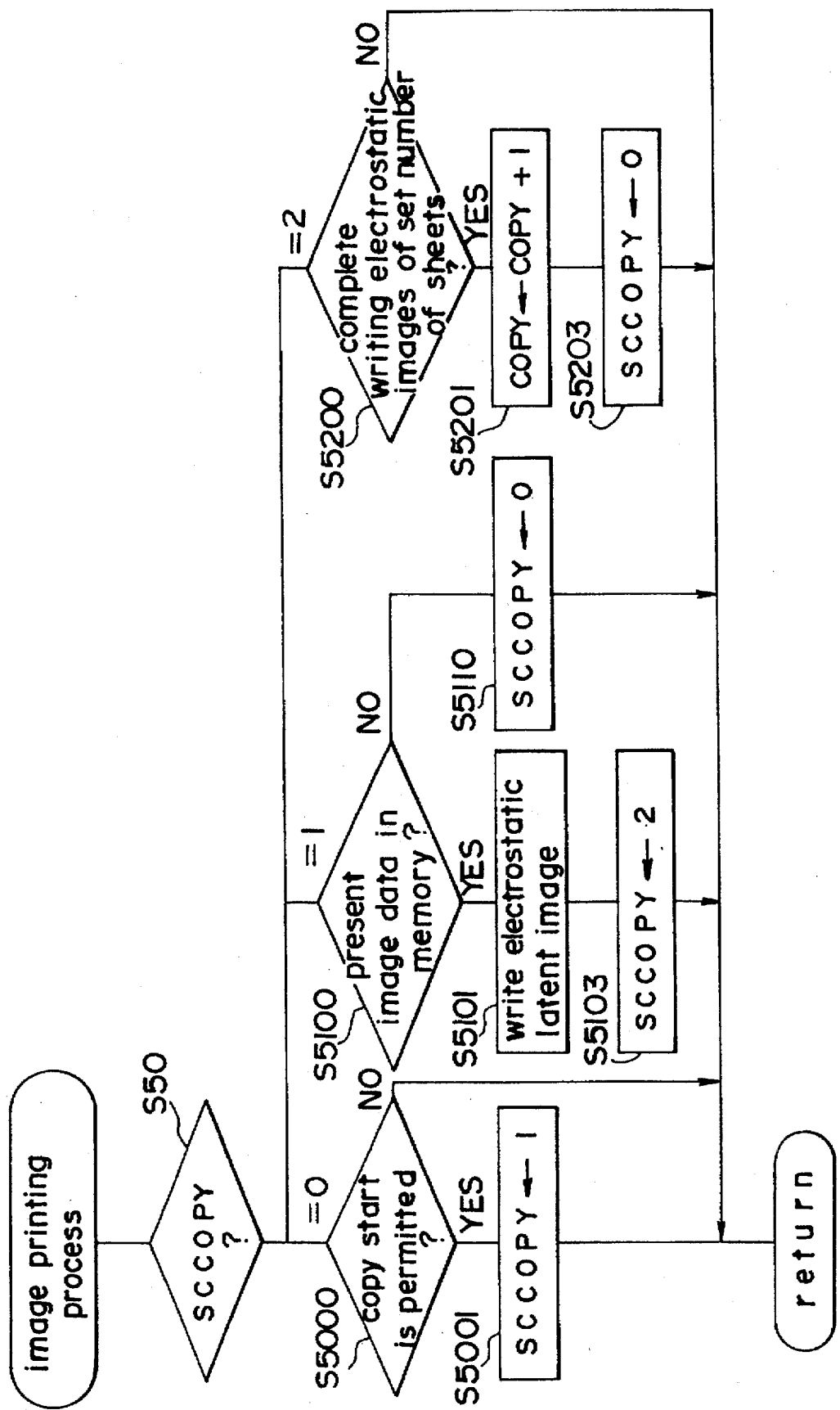
FIG. 7 is a flow chart showing the image printing process executed by the MPU of FIG. 3.

Image printing process (FIG. 7)

In this process, a command is issued to write an electrostatic latent image under the condition that image data are stored in memory. After completion of writing electrostatic latent images for the set number of sheets, the variable COPY, expressing the number of original document sheets of erased data, is incremented.

At initialization, state counter SCCOPY is zero [0].

The copy enabled state is entered when print key 101 is switched ON. When copy start is permitted (step S5000: YES), SCCOPY is set at [1] (step S5001).

When SCCOPY is set at [1], a determination is made as to the presence of image data in memory. When image data are present in memory (step S5100: YES), a command to write an electrostatic latent image corresponding to the oldest image screen (the original document read first among those stored in memory) is issued to printer section 50 (step S5101).

Thereafter, SCCOPY is set at [2] (step S5103).

On the other hand, when image data are not present in memory (step S5100: NO), SCCOPY is set at [0] because there is no electrostatic latent image to be written to photosensitive drum 11 (step S5110).

When SCCOPY is set at [2], completion of writing the electrostatic latent images of the set number of sheets of image data is awaited. When writing is completed (step S5200: YES), the variable COPY is incremented (step S5201). The aforesaid image data are erased from memory with this timing. Accordingly, the variable COPY is a variable expressing the number of original document sheets of erased data.

Thereafter, SCCOPY is set at [0] (step S5203).

Figure 8:
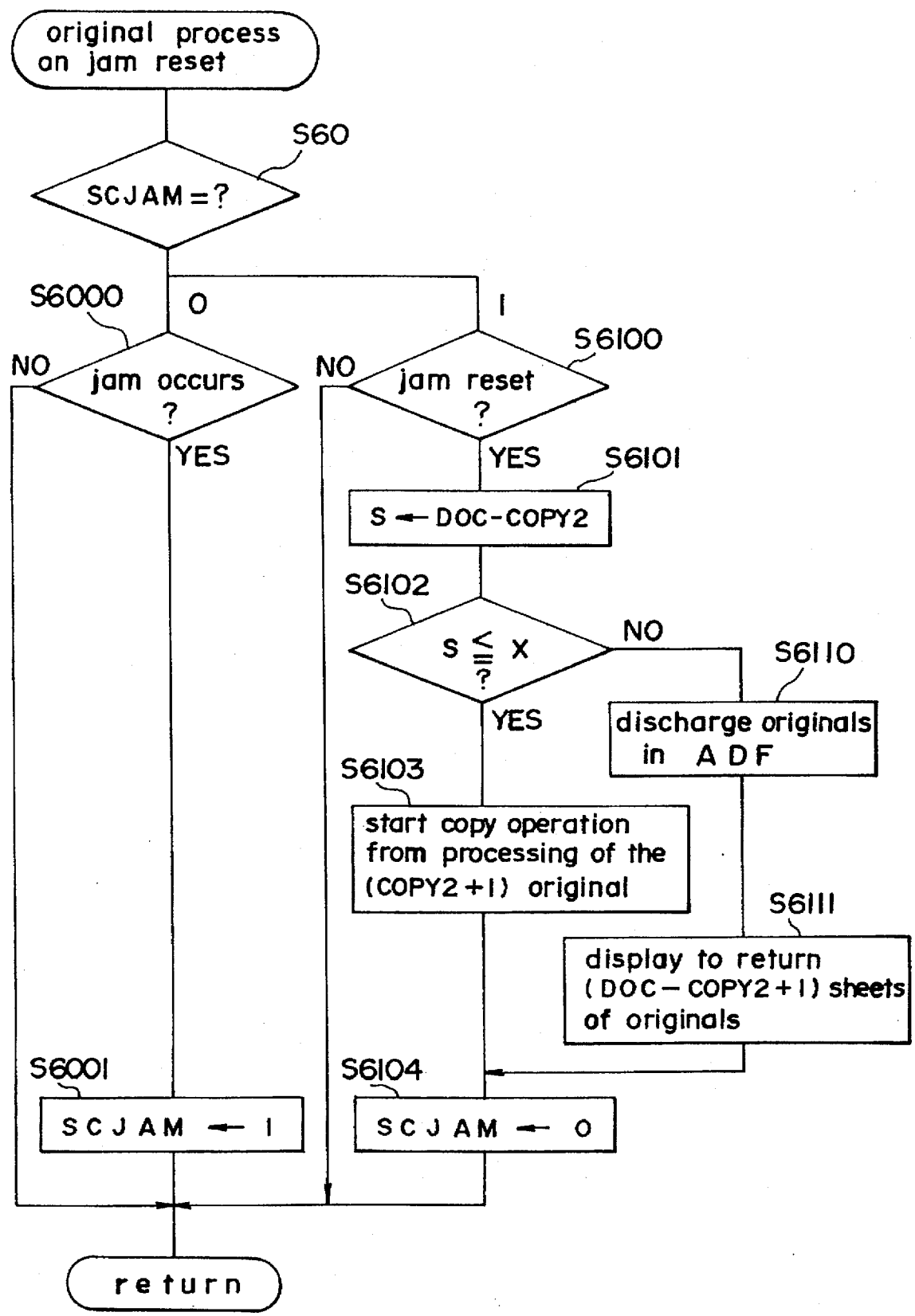
FIG. 8 is a flow chart showing one example of the original document process on jam reset executed by the MPU of FIG. 3.

Original document process on jam reset (FIG. 8)

At initialization, state counter SCJAM is zero [0].

When a copy sheet jam occurs in printer section 50 (step S6000: YES), SCJAM is set at [1] (step S6001).

Jam reset information is awaited when SCJAM is set at [1] (step S6100).

After the jammed copy sheet has been removed by an operator, and the jam reset switch is operated from printer section 50 to input jam reset information (step S6100: YES), the value resulting when COPY2, expressing the number of original documents that have been copied, is subtracted from DOC, expressing the number of original documents stored in image data memory, i.e., the number of original documents which have been fed from document tray 32 and the images thereof read but have not yet been copied, is substituted by variable S (step S6101).

In step S6102, a comparison is made between the value of the aforesaid variable S and the maximum value X of the number of image screens (amount of image data expressed as the number of original document sheets) storable in memory.

When the comparison result is such that the value S is less than the maximum value X (step S6102: YES), i.e., in regard to originals which have been fed from document tray 32 and the images thereof read but have not yet been copied, the image data of said originals are stored in memory, the copy operation can be started from the processing of the (COPY2+1) original document (step S6103). That is, images are formed on copy sheets sequentially from the oldest image data (image data of the original document first stored in memory). In case that an original document is present, which has been fed from document tray 32 and the image thereof has not yet been read, i.e., an original which is placed on the document platen and stands-by until the memory becomes to have a margin of excess storage capacity to store new image data, the image of said original document is scanned when the memory becomes to have the margin and the copy operation is restarted (refer to steps S4200 and S4201 of FIG. 5).

Thereafter, SCJAM is set at [0] (step S6104).

On the other hand, when the value of S exceeds the maximum value X, i.e., when the number of original documents S exceeds the maximum number X (step S6102: YES), the original documents in the feed path of the ADF are discharged to document discharge tray 33 (step S6110). Instructions are displayed to return the (DOC-COPY2+1) sheets of original documents to document tray 32. (step S6111).

Thereafter, SCJAM is set at [0] (step S6104).

Figure 9:
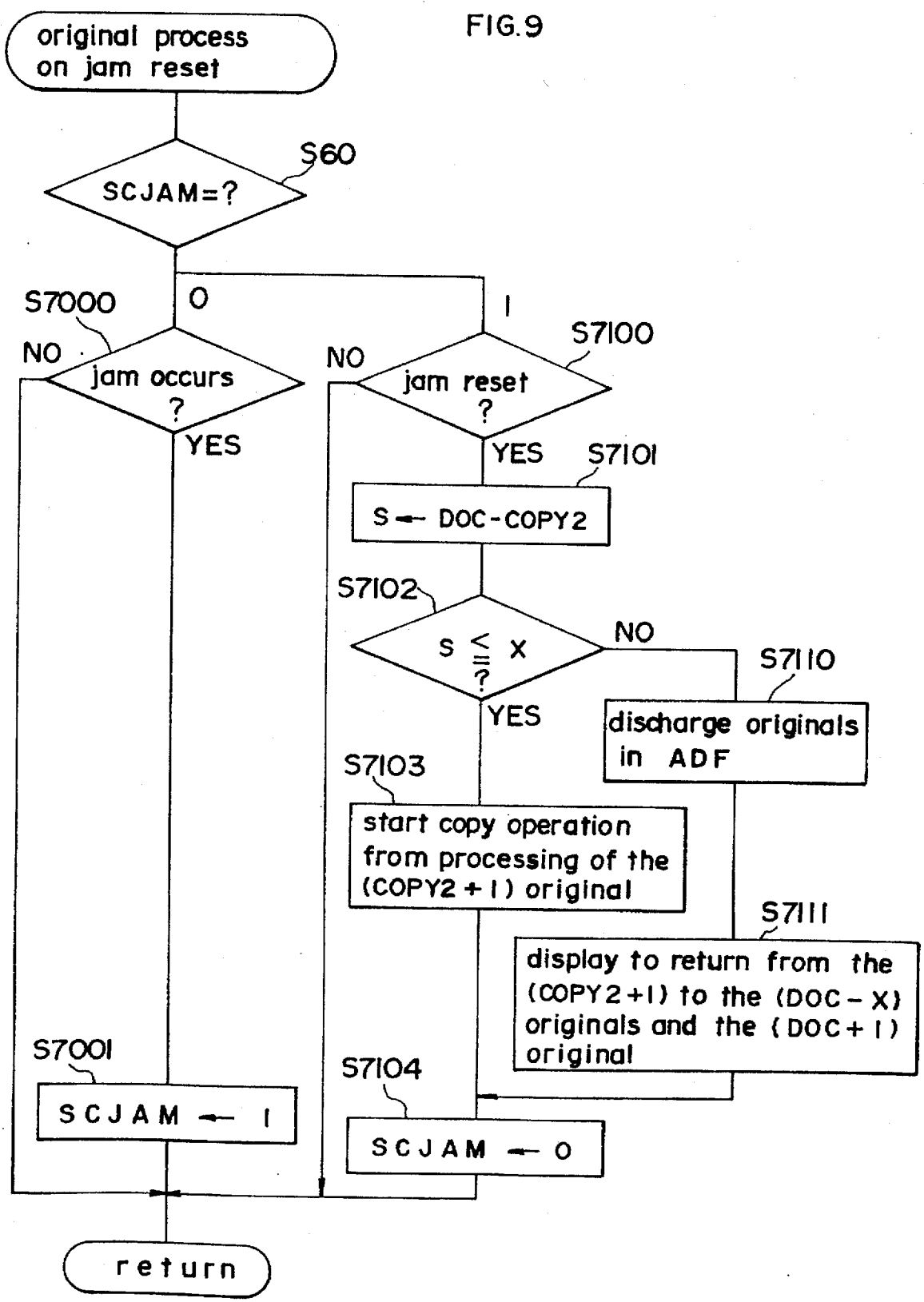
FIG. 9 is a flow chart showing another example of the original document process on jam reset executed by the MPU of FIG. 3.

Other example of original document process on jam reset (FIG. 9)

In the jam reset process shown in FIG. 8, when the number of original documents S, which have been fed from document tray 32 and the images thereof read but not copied, exceeds the maximum number X of image screens storable in memory (step S6102: NO), instructions are displayed to return to document tray 32 all original documents assumed to have not been copied. In the process of FIG. 9, however, when the value S exceeds the value X (step S7102: NO), instructions are displayed to return to document tray 32 the originals documents from (COPY2+1) to (DOC-X) and the original document (DOC+1) (step S7111). It is to be noted that original document (DOC+1) is the document which has been set to the standard position on the document platen but is discharged without having its image data stored in memory. Thus, the image data of original documents stored in memory are used to form images on copy sheets, and only those original documents for which image data are not stored in memory are returned to document tray 32.

Since the other steps shown in the process of FIG. 9 are identical to those of FIG. 8, the step numbers are identical from the third digits, and the description of these steps is omitted.

Although the number of returned originals is displayed in the aforesaid examples, it is to be understood that when an ADF of a type which recirculates originals is used, controls may be executed so as to return originals of a displayed number of sheets.

Although according to the above embodiments, an original document stands-by on the document platen when the memory is full, an original document may stand-by on a feed tray.

Further, although according to the above embodiments, an original placed on the document platen is read via scanning by moving mirrors in image reader section 1, an original may be read via passing the original on the document platen without moving mirrors in image reader section.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A digital copying apparatus comprising:

an image reader which reads an image of an original document, placed on a document platen, and generates original document image data therefrom;

a memory which stores the original document image data generated by said image reader;

image forming means for forming onto a copy sheet an image corresponding to the original document image data stored in said memory for an original document;

jam detection means for detecting copy sheet jams during operation of said image forming means;

an automatic document feeding device having a document transport path that transports an original document from a feed tray to the document platen and that discharges to a discharge tray an original document which has been read by said image reader;

a discharge sensor which detects discharge of copy sheets;

decision means for determining, when a copy sheet jam detected by said jam detection means has been reset, whether or not the original document image data, which have been generated by said image reader but which have not been copied yet are stored in said memory, based on the detection result of said discharge sensor; and control means for discharging an original document from the document transport path to the discharge tray when said decision means determines that not all uncopied original document image data are stored in said memory, and for restarting copy operation using the original document image data stored in said memory when said decision means determines that all uncopied original document image data are stored in said memory.

2. The digital copying apparatus as claimed in claim 1 further comprising a display for displaying the number of the specified original documents, wherein, when said decision means determines that not all uncopied original document image data are stored in said memory, said control means discharges the original document to the discharge tray and displays on said display the number of the original documents to be returned to the feed tray.

3. The digital copying apparatus as claimed in claim 1 further comprising a display for displaying the number of the specified original documents; wherein, when said decision means determines that not all uncopied original document image data are stored in said memory, said control means discharges the original document to the document discharge tray, displays on said display the number of the original documents to be returned to the document feed tray and restarts copy operation using the original document image data stored in said memory.

4. The digital copying apparatus as claimed in claim 1, wherein said image reader reads the original document on condition that there is a margin of excess storage capacity in said memory to store new original document image data.

5. The digital copying apparatus as claimed in claim 4, wherein, when said memory is full, said control means provides that the original document placed on the document platen stands by until a margin of excess storage capacity to store new image data is generated in said memory.

6. The digital copying apparatus as claimed in claim 4, wherein, when said memory is full, said control means provides that the original document stands by on the feeding tray until a margin of excess storage capacity to store new image data is generated in the memory.

7. The digital copying apparatus as claimed in claim 1, wherein said image forming means forms an electrostatic latent image on condition that original document image data are present in said memory, and the original document image data for an original document are deleted from said memory after completion of forming electrostatic latent image of that original document for designated times by said image forming means.

8. A digital copying apparatus comprising:

an image reader which reads an image of an original document placed on a document platen and generates original document image data therefrom;

a memory which stores the original document image data generated by said image reader;

image forming means for forming onto a copy sheet an image corresponding to the original document image data stored in said memory for an original document;

jam detection means for detecting copy sheet jams during operation of said image forming means;

an automatic document feeding device having a document transport path that transports an original document from a feed tray to the document platen and that discharges to a discharge tray an original document which has been read by said image reader;

a display for displaying the number of specified original documents;

a discharge sensor which detects discharge of copy sheets;

comparing means for comparing, when a copy sheet jam detected by said jam detection means is reset, a capacity of said memory and a quantity of uncopied original document image data which has been generated by said image reader but has not been copied yet, said quantity of uncopied original document image data being calculated based on the detection result of said discharge sensor; and control means for discharging an original document from the document transport path to the discharge tray and displaying on said display the number of the original documents to be returned to the feed tray when the quantity of uncopied original document image data is larger than the capacity of said memory, and for restarting copy operation using the original document image data stored in said memory when the quantity of uncopied original document image data is not more than the capacity of the memory.

9. The digital copying apparatus as claimed in claim 8, wherein said image reader reads the original document on condition that there is a margin of excess storage capacity to store new image data in said memory.

10. The digital copying apparatus as claimed in claim 9, wherein, when said memory is full, said control means causes the original document, placed on the document platen, to stand by until a margin of excess storage capacity to store new image data is generated in the memory.

11. The digital copying apparatus as claimed in claim 9, wherein, when said memory is full, said control means causes the original document to stand by on the feed tray until a margin of excess storage capacity to store new image data is generated in the memory.

12. The digital copying apparatus as claimed in claim 8 wherein said image forming means forms an electrostatic latent image on condition that original document image data are present in said memory, and the original document image data for an original document are deleted from said memory after completion of forming an electrostatic latent image of that original document for designated times by said image forming means.

13. A digital copying apparatus comprising:

an image reader which reads an image of an original document, placed on a document platen, and generates original document image data therefrom;

a memory which stores the original document image data generated by said image reader;

image forming means for forming onto a copy sheet an image corresponding to the original document image data stored in said memory for an original document;

jam detection means for detecting copy sheet jams during operation of said image forming means;

an automatic document feeding device having a document transport path that transports an original document from a feed tray to the document platen and that discharges to a discharge tray an original document which has been read by said image reader;

a display for displaying a message concerning specified original documents;

a discharge sensor which detects discharge of copy sheets;

decision means for determining, when a copy sheet jam detected by said jam detection means is reset, whether or not the original document image data, which have been generated by said image reader but have not been copied, are stored in said memory, based on the detection result of said discharge sensor; and control means for, when said decision means determines that not all uncopied original document image data are stored in the memory, restarting copy operation using the original document image data stored in said memory and specifying on the display the original documents having the uncopied original document image data which have not been stored in the memory.

* * * * *